United States Patent
Bowie

(10) Patent No.: US 9,027,602 B2
(45) Date of Patent: May 12, 2015

(54) ISOLATION TOOL

(75) Inventor: Angus George Bowie, Aberdeen (GB)

(73) Assignee: Stats (UK) Limited, Aberdeenshire (GB)

( * ) Notice: Subject to any disclaimer, the term of this patent is extended or adjusted under 35 U.S.C. 154(b) by 907 days.

(21) Appl. No.: 12/915,466

(22) Filed: Oct. 29, 2010

(65) Prior Publication Data

US 2011/0100649 A1 May 5, 2011

(30) Foreign Application Priority Data

Oct. 30, 2009 (GB) .................................. 0919022.4

(51) Int. Cl.
*F16L 55/10* (2006.01)
*F16L 55/124* (2006.01)
*G01M 3/02* (2006.01)

(52) U.S. Cl.
CPC .............. *F16L 55/124* (2013.01); *G01M 3/022* (2013.01)

(58) Field of Classification Search
USPC ........ 138/89, 94, 93; 166/387, 120, 123, 191; 137/15.08, 317, 318
See application file for complete search history.

(56) References Cited

U.S. PATENT DOCUMENTS

| 1,177,338 | A | * | 3/1916 | Kayfetz | 138/94 |
|---|---|---|---|---|---|
| 1,747,933 | A | * | 2/1930 | Goodman et al. | 138/94 |
| 3,626,475 | A | * | 12/1971 | Hicks | 138/94 |
| 4,144,908 | A | * | 3/1979 | Dunn | 138/93 |
| 5,778,919 | A | * | 7/1998 | Petrone | 137/15.08 |
| 5,934,311 | A | * | 8/1999 | Brown | 137/240 |
| 7,000,641 | B2 | * | 2/2006 | Welfare | 138/93 |
| 8,267,124 | B2 | * | 9/2012 | Bowie | 138/98 |
| 2006/0086400 | A1 | | 4/2006 | Beebe et al. | |
| 2007/0023096 | A1 | * | 2/2007 | Buckley et al. | 138/89 |
| 2008/0017390 | A1 | | 1/2008 | Bowie | |
| 2009/0114302 | A1 | | 5/2009 | Yeazel et al. | |

FOREIGN PATENT DOCUMENTS

| DE | 3145284 A1 | 5/1983 |
|---|---|---|
| EP | 0232576 A1 | 8/1987 |
| EP | 1223305 A2 | 7/2002 |

OTHER PUBLICATIONS

Extended European Search Report for EP Application No. 10251879.2 dated May 2, 2014.

* cited by examiner

*Primary Examiner* — Patrick F Brinson

(74) *Attorney, Agent, or Firm* — Carlson, Gaskey & Olds, P.C.

(57) ABSTRACT

A method of isolating a section of pipe includes the steps of locating a seal unit having two seal elements in a pipe via a penetration in the pipe, such as a branch or tee. The seal unit is then positioned in the pipe downstream of the penetration. The seal elements are activated using a primary activation mechanism to engage the pipe wall and then maintained in an activated condition using a secondary activation mechanism.

20 Claims, 1 Drawing Sheet

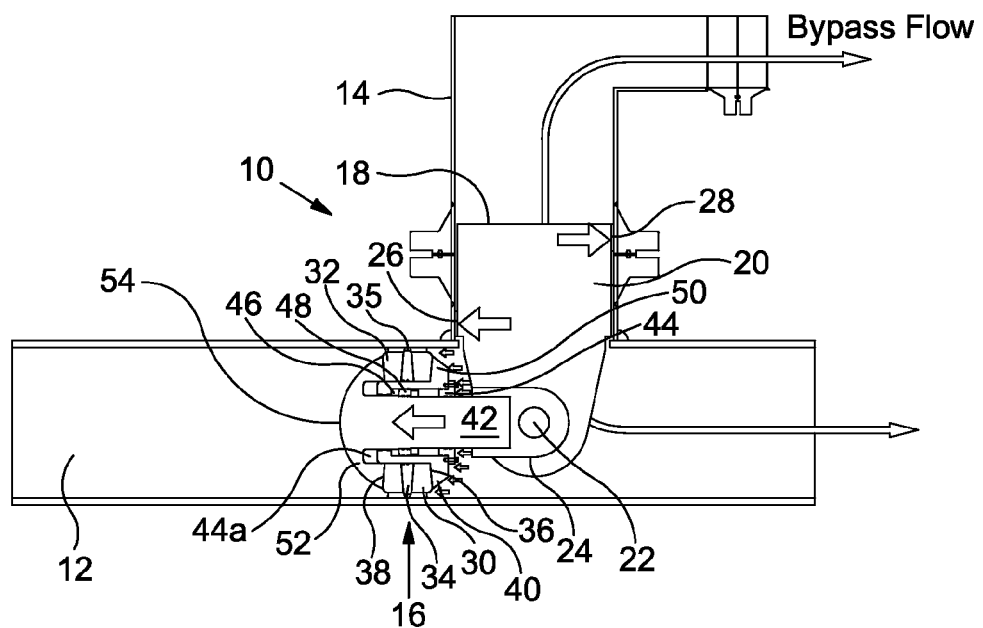

ISOLATION TOOL

REFERENCE TO RELATED APPLICATION

This application claims priority to United Kingdom Application No. GB 0919022.4 filed Oct. 30, 2009.

FIELD OF THE INVENTION

The present invention relates to an isolation tool for use in a pipe. Embodiments of the invention relate to a self-energizing isolation tool for use in isolating a section of a pipe transporting fluids such as oil, gas or the like.

BACKGROUND TO THE INVENTION

The oil and gas industry has for many years used hot tapping and stoppling techniques in order to provide localised isolation of a "live" section of pipe.

Hot tapping involves the fitting of a branch or tee connection to a live pipeline containing fluid at pressure. The connection may be welded or mechanically secured to the pipe, a valve being subsequently fitted to the connection. A tapping or drilling tool is then connected to the valve, the tapping tool being activated to pass through the open valve and drill through the pipe wall to create the branch. The tapping tool is configured to prevent leakage of fluid from the pipe during the pipe cutting operation. On completion of the drilling process, the tapping tool may be removed and the valve closed to complete the branch connection. Thus, fluid may be selectively directed via the branch connection. Alternatively, or in addition, tools may be inserted and/or removed via the hot tap connection to perform a variety of tasks within the pipe.

Conventionally, where pipe isolation is required, a plug or line stop tool including a lip seal is inserted through the tap connection to provide uni-directional sealing isolation of the pipe inboard, or downstream, of the stopple. In order to apply a test pressure to test the integrity of the stopple seal, a second opening is cut into the pipe at a location outboard, or upstream, from the first opening and a second plug or stopple put in place. A smaller third opening is drilled between the first and second openings to pressurize the isolated area between the first and second stopples, and thus pressure test the first or primary stopple seal, and also the second seal. This may only be achieved if the uni-directional lip seal arrangement of the second stopple is arranged against the prevailing pressure, that is in the opposite orientation to the first or primary seal. Thus, although two pressure-tested seals have been provided, only one, the primary seal, is effective against the isolated pressure. In addition, each intervention into the pipe requires additional planning, setup and operation time resulting in increased costs for the operator.

Applicant's BISEP double block and bleed hot tap installed isolation device, as described in US patent application publication no US2008/0017390, the disclosure of which is incorporated herein in its entirety, provides an alternative solution. The BISEP device may be installed through a branch connection and a seal unit in the form of a spherical or globe seal module rotated to face outboard or upstream and hydraulically or otherwise activated to seal with the pipe upstream of the branch. The branch and the pipe inboard or downstream of the device are then isolated from upstream pipe pressure. The seal module carries a pair of seal elements and the module is configured such that the pressure differential acting across the module further energises the seal elements. Thus, in the event of a failure of the external seal activation, isolation is maintained. Furthermore, an annular chamber between the seal elements may be pressurised to confirm the integrity of both seal elements.

The arrangement of the seal element also permits the BISEP device to be utilised as a weld test tool, by locating the seal elements straddling a weld, and then pressurising the annulus between the seal elements.

SUMMARY OF THE INVENTION

According to a first aspect of the present invention, there is provided a method of isolating a section of pipe, the method including the steps of locating a seal unit having at least two seal elements in a pipe via a penetration in the pipe, positioning the seal unit in the pipe downstream of the penetration, activating the seal elements using a primary activation mechanism to engage the pipe wall, and maintaining activation of the seal elements using a secondary activation mechanism.

According to a second aspect of the present invention, there is provided an isolation tool for use in isolating a section of a pipe. The isolation tool includes a seal unit configured to be located in a pipe via a single opening in the pipe wall and including at least two seal elements configured to be activated by a primary activation mechanism to engage the pipe wall downstream of the opening to isolate a section of pipe downstream of the opening. The seal elements are configured to maintain their activation by a secondary activation mechanism.

When used herein, the terms "upstream" and "outboard" are intended to indicate the higher pressure side of an isolation tool, and the terms "downstream" and "inboard" intended to indicate the lower pressure side, which will typically be the side oriented towards an isolated section of pipe.

By locating the seal unit downstream of the penetration or opening it is possible to allow fluid to flow from the upstream section of the pipe and through the penetration or opening, that is it is possible to utilise the penetration as a flow path. This allows, for example, bypass flow from the upstream section of pipe to a point in the pipe beyond the isolated pipe section.

The primary activation mechanism may be hydraulically actuated, or may be mechanically, electromagnetically or pneumatically actuated. The secondary activation mechanism may be a mechanical lock. Thus, the lock may serve to maintain the activation of the seal elements in the event of a failure of the primary activation mechanism. Alternatively, the secondary activation mechanism may be configured to be actuated by differential pressure acting across the seal unit. Thus, in a higher pressure application, where a sufficient pressure differential is present across the seal unit, the seal unit will remain activated in the event of a failure of the primary activation mechanism.

The tool may include an anchor for supporting the seal unit relative to a tee or branch which is fixed relative to the pipe. The anchor may be configured to retain a flow path for fluid flowing through the tee or branch, whereby fluid may flow from the upstream section of pipe and through the branch, bypassing the downstream section of pipe which has been isolated by the tool. Baffles or flow diverters may be provided to protect or divert flow away from elements of the tool.

The seal unit may include a mandrel secured to the anchor. The seal elements may extend around the mandrel and a downstream side of a secondary seal element may be supported by the mandrel. An activating member may be mounted on the mandrel and may be configured to be translated in a downstream direction to compress or otherwise activate the seal elements. The activating member may engage an upstream side of a primary seal element.

The activating member may define a primary pressure head configured to be exposed to upstream pressure, and the mandrel may define a secondary pressure head configured to be exposed to lower downstream pressure. Thus, upstream pressure may act on the primary pressure head and activate the seal elements.

The activating member may be coupled to an actuation mechanism. The actuation mechanism may include a chamber configured to receive hydraulic fluid, supply of fluid to the chamber causing the activating member to translate and activate the seal elements. The mandrel may define a wall of the chamber. The mandrel may be pivotally mounted to the anchor, and may be hinged to the anchor. The anchor may include a pair of clevis arms.

It will be understood that reference to the term pipe includes any tubular construction including an oil or gas pipeline, whether subsea, above or below ground, downhole tubing, or indeed any other tubular suitable for transport or storage of fluids.

The isolation tool may be adapted to be inserted into the pipe through a hot tap or the like, or through an established or existing branch, tee or opening.

At least one of the seal elements may be capable of sealing the section of pipe. In particular, in preferred embodiments of the invention either of the seals may be capable of resisting the full differential pressure between the pressurised or upstream portion of the pipe and the isolated or downstream portion of the pipe.

At least one of the seal elements may be a bi-directional seal. Accordingly, either or both of the seal elements may provide full sealing capability. Where a bi-directional element is used, this isolation tool can resist downstream pressure and can be used to pressure test the isolated section once the repair or modification is complete. At least one of the seal elements includes an elastomeric seal. At least one of the seal elements may include a compression seal, that is, a seal that is set or energized by compressing the seal. In one example, both seal elements include compression seals.

The seal elements may be adapted to be compliant to the pipe surface. Thus, seal integrity may be maintained where the inner surface of the pipe is irregular or has been subject to damage. The seal elements may be adapted to be self-energized on the seal unit experiencing a predetermined differential pressure.

The seal elements may be actuated at least in part mechanically, hydraulically or by any other suitable manners. The actuation force may be externally applied. Alternatively, or in addition, a differential pressure across the seal unit may actuate the seal elements. In a preferred embodiment, a predominant proportion of the load generated on the seal unit by the pipe or differential pressure is transmitted through the seal unit to the seal elements, which may be annular. Thus, as the cross-sectional area of the annular seal elements is less than the pipe cross-sectional area and of the seal unit, the pressure transmitted through the seal elements is greater than the pipe pressure, thus preventing bypass of fluid around the seal and assisting in prevention of explosive decompression of the seal.

The seal elements may be adapted to be initially compressed to provide at least initial isolation of the pipe. This is advantageous in particular where the tool is used in lower pressure applications.

At least one anti-extrusion spring may be provided for each seal element. Thus, the seal member is prevented from extruding when exposed to high differential pressures or high compressive loads.

The seal unit may be adapted to be introduced into a pipe via a branch, which will typically be perpendicular to the pipe axis. The seal unit may be adapted to pass through the branch in alignment with the branch axis and then be rotated for alignment with the pipe axis. The seal unit may be adapted to be rotated through approximately 90 degrees. Seal unit rotation may be actuated at least in part hydraulically, mechanically, by a combination of hydraulic and mechanical actuation or by any other suitable manners.

The seal unit may include a location linkage, which may include a clevis. The location linkage may include a support member, which may include a padeye. The location linkage may be configured to locate the seal unit spaced from the branch, for example a dimension of a location linkage clevis, such as the length of the clevis, may be selected to control the axial positioning of the seal unit within the pipe.

The seal unit may include a seal actuator including a fluid piston, the piston being adapted to translate to provide compression of the seal elements. In one embodiment, axial compression of the seal elements deforms the elements radially outwards into contact with the circumferential wall of the pipe to provide a seal therebetween. Alternatively, or in addition, the seal actuator may be adapted to translate by application of a pressure differential across the actuator. The pressure differential may be induced by applying or providing an elevated pressure outboard of the seal unit in the pipe. Alternatively, or in addition, the differential pressure may be induced by venting fluid to create a lower pressure region inboard of the seal unit. The seal unit may include an annular ring located around a central portion of the seal unit and between the seal elements.

In use, the seal unit may be adapted to define an annular volume or chamber between the seal elements, the annular ring and the pipe. The annular ring may include a fluid conduit adapted for communication with the volume. The fluid conduit may include a bleed port adapted to permit fluid to be bled from the annular volume. The seal integrity may be pressure tested by monitoring the pressure in the annular chamber.

The tool may be adapted for isolating a pipe in high pressure applications, for example isolating a pipe section against up to approximately 200 bar differential pressure. Alternatively, the tool may be utilised in low pressure applications.

The tool may be adapted to be removable from the pipe, typically through the opening through which the tool was introduced into the pipe. In a preferred embodiment of the present invention, the seal elements may be deactivated by deactivating a seal actuator, for example by bleeding off fluid from an actuating piston.

Alternatively, or in addition, the seal elements may be adapted to be deactivated by application of pressure on the actuator, for example, by application of pressure on the outboard side of the fluid piston. On equalization of pressure across the seal unit, the tool may be removed from the pipe. The tool may be adapted to be removed from the pipe via a hot tap connection. Activating the seal elements may include radially extending the elements from a retracted configuration.

The method of the invention may further include the step of applying an elevated pressure to a volume between the seal elements to test the pressure integrity of both seal elements. The method may further include the step of rotating the seal unit after insertion into the pipe to align the seal elements with the pipe axis. The method may further include the step of forming an opening in a wall of a pipe, which may be achieved by hot tapping.

BRIEF DESCRIPTION OF THE DRAWING

These and other aspects of the present invention will now be described, by way of example only, with reference to the accompanying drawing, in which FIG. 1 is a cross sectional view of an isolation tool located within a hop tapped section of pipe in accordance with a preferred embodiment of the present invention.

DETAILED DESCRIPTION OF THE DRAWING

FIG. 1 shows an isolation tool 10 in accordance with a preferred embodiment of the present invention, the tool 10 shown located within a section of pipe 12.

A tee or branch connection 14 has been created in the pipe 12 by hot tapping, and the tool 10 inserted via the hot tap connection 14. The tool 10 includes a seal unit in the form of a spherical seal module 16. The seal module 16 is mounted to an anchor assembly 18 via a clevis 20, a hinge pin 22 and a padeye 24.

The anchor assembly 18 is configured to fit snugly within the branch 14 and defines a bearing shoulder 26 directed downstream and a reaction shoulder 28 directed upstream for engaging opposing inner surfaces of the branch 14.

The seal module 16 includes annular primary and secondary seal elements 30 and 32 separated by a rigid ring 34 and a test/bleed annulus 35. A fluid line (not shown in the drawing) extends from the annulus 35 to a tool control unit (not shown). The seal elements 30 and 32 are compression seals and are mounted between primary and secondary compression shoulders 36 and 38. The primary compression shoulder 36 is defined by an activating member 40, which provides radial support for the seal elements 30 and 32 and is mounted on a mandrel 42 coupled to the padeye 24. An inner surface of the activating member 40 and an outer surface of the mandrel 42 define an annular chamber 44. A sealing piston 46 secured by a ring 48 fixed to the mandrel 42 divides the chamber 44, such that the supply of hydraulic fluid to the downstream chamber portion 44a will tend to translate the activating member 40 to compress and activate the seal elements 30 and 32. The activating member 40 also defines a primary pressure head 50, that is an area exposed to higher upstream pressure such that a pressure energization load is also applied to the seal elements 30 and 32.

The secondary compression shoulder 38 is defined by a tension member 52 coupled to the downstream end of the mandrel 42. The member 52 and the mandrel 42 define a secondary pressure head 54, and that is an area exposed to lower downstream pressure in the isolated section of the pipe 12.

In use, the tool 10 is moved down through the branch 14 and once the spherical seal module 16 is inserted into the pipe 12, the module 16 is rotated to face downstream, as illustrated in the drawing. The mechanism for rotating the module 16 is not illustrated in the drawings, but may take any appropriate form, and may be actuated by hydraulic, pneumatic, electromagnetic or mechanical means.

Hydraulic fluid is then supplied to the downstream chamber portion 44a, which urges the activating member 40 downstream and compresses the seal elements 30 and 32 such that the elements radially extend into contact with the pipe, providing initial isolation. The pipe section downstream of the module 16 is then depressurized, which generates a pressure differential across the set module 16. This differential pressure applies a load to the primary pressure head 50 equivalent to the differential pressure multiplied by the cross sectional area of the pressure head. This load acts in parallel to the initial actuation to further energizes the seal elements 30 and 32. The load is balanced by the seal element rubber pressure which, as it is acting across a smaller cross sectional area, generates a rubber pressure in excess of the pressure differential across the module 16. This effect is known as self-energization and will maintain the seal energization independently of the initial activation of the seal elements 30 and 32, provided a minimum differential pressure is maintained.

The applied load passes through both seal elements 30 and 32 maintaining dual seal isolation, to the secondary pressure head 54. As described above, the secondary pressure head 54 is securely restrained relative to the clevis arms 20 by the mandrel 42.

The tool 10 may experience significant forces and thus is designed to provide acceptable redundancy. In particular, each of the clevis arms 20 is capable of retaining the full design load for the tool 10. The hinge pin 22 has two shear areas, each of which is capable of supporting the full design load. The padeye 24, and the connection between the padeye 24 and the mandrel 42, are each designed with 100% contingency.

The seal elements 30 and 32 are dual directional such that after, for example, the maintenance work on the isolated pipe section has been completed, the newly installed pipework may be pressure tested.

It will be apparent to those of skill in the art that this embodiment provides a number of advantages over conventional tools, including the ability to provide dual compression seal elements in a pipe using only a single penetration. The compression seals 30 and 32 are highly compliant to poor pipe bore conditions so provide leak-tight sealing in most applications.

The provision of the bleed/test annulus 35 between the seal elements facilitates both the application of test pressure and the ability to bleed and monitor the condition of the seal elements 30 and 32. Both seal elements 30 and 32 may be independently tested to the pipeline pressure. Also, using the fluid line extending from the annulus 35, the annulus 35 may be used to provide a bleed between the seal elements 30 and 32 where leak tight sealing of the primary seal element 30 proves impractical.

Both seal elements 30 and 32 are maintained in an energised state by dual systems during the isolation. The isolated pressure provides self-energisation when the tool 10 is used in high pressure systems in addition to the original actuation load.

For low pressure applications, with insufficient differential pressure to achieve self-energization, an embodiment of the invention may be configured such that an initial seal actuation system provides the primary actuation, with a mechanical lock providing secondary actuation.

The seal module 16 is inserted into the pipe 12 in an unset configuration. The seal module 16 may be inserted into a flowing pipe, the unset module offering significant bypass, such that the tool 10 may be deployed safely into high flow-rates. Only when the seal elements are set, under the control of the operator, is flow stopped.

The location of the tool 10 downstream of the branch provides the ability to tie-in a bypass through the same penetration as the tool 10 is inserted through.

Insertion and retraction of the tool 10 may be performed by any manner, for example, a hot tap machine, stem bar, hydraulic (or pneumatic) cylinder, lead screw, rack and pinion.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method of isolating a section of pipe, the method comprising the steps of:
   locating a seal unit having at least two seal elements in a pipe via a penetration in the pipe, wherein the seal unit comprises a mandrel secured to an anchor for supporting the seal unit relative to a tee or branch fixed relative to the pipe;
   positioning the seal unit in the pipe downstream of the penetration;
   activating the at least two seal elements using a primary activation mechanism to engage a pipe wall, wherein the step of activating the at least two seal elements comprises translating an activating member mounted on the mandrel away from the anchor;
   maintaining activation of the at least two seal elements using a secondary activation mechanism.

2. The method of claim 1, comprising the step of bypassing flow from an upstream section of pipe to a point in the pipe beyond an isolated pipe section.

3. The method of claim 1, comprising the step of maintaining the actuation of the secondary activation mechanism and maintaining the activation of the at least two seal elements following failure of the primary activation mechanism.

4. The method of claim 1, comprising the step of anchoring the seal unit relative to the tee or the branch fixed to the pipe.

5. The method of claim 1, comprising the step of venting a pipe section downstream of the seal unit.

6. The method of claim 1, comprising the step of bleeding pressure from a volume between the at least two seal elements.

7. An isolation tool for use in isolating a section of a pipe, the isolation tool comprising:
   a seal unit configured to be located in a pipe via a single opening in a pipe wall and comprising at least two axially spaced seal elements configured to be activated by a primary activation mechanism to engage the pipe wall downstream of the single opening to isolate a section of the pipe downstream of the single opening, wherein the seal elements are further configured to maintain activation by a secondary activation mechanism, wherein the seal unit comprises a mandrel secured to an anchor for supporting the seal unit relative to a tee or branch fixed relative to the pipe, and wherein an activating member is mounted on the mandrel and is configured to be translated away from the anchor to activate the seal elements.

8. The isolation tool of claim 7, wherein the secondary activation mechanism is configured to be actuated by differential pressure acting across the seal unit.

9. The isolation tool of claim 7, wherein the isolation tool is adapted to be inserted into the pipe through a hot tap.

10. The isolation tool of claim 7, wherein the seal unit is adapted to be rotated through an angle relative to a tool anchor, and the angle is approximately 90 degrees.

11. The isolation tool of claim 7, wherein the seal unit comprises an annular ring located around a central portion of the seal unit and between the at least two axially spaced seal elements.

12. The isolation tool of claim 7, wherein the at least two axially spaced seal elements are adapted to be deactivated by application of pressure on a seal actuator.

13. The isolation tool of claim 7, wherein the tool is adapted to provide a pressure test boundary for the isolated section of the pipe.

14. The isolation tool of claim 7, wherein the seal elements are disposed on the activating member.

15. The isolation tool of claim 7, wherein the mandrel defines a pressure head of the secondary activation mechanism configured to be exposed to downstream pressure.

16. The isolation tool of claim 7, wherein the activating member is configured to be translated in a downstream direction to activate the seal elements.

17. The isolation tool of claim 7, wherein the activating member defines a pressure head configured to be exposed to upstream pressure.

18. The method of claim 1, comprising the step of directing fluid from an upstream section of pipe through the penetration.

19. The method of claim 1, wherein the secondary activation mechanism maintains activation by at least one of:
   applying a differential pressure across the seal unit by venting fluid to create a lower pressure region inboard of the seal unit;
   applying a differential pressure across the seal unit by applying or providing an elevated pressure outboard of the seal unit in the pipe; and
   providing a mechanical lock.

20. The method of claim 19, comprising applying the differential pressure across an activating member of the primary activation mechanism.

* * * * *